United States Patent [19]

Reime

[11] Patent Number: 5,267,093
[45] Date of Patent: Nov. 30, 1993

[54] VIDEO RECORDER HAVING PHASE-DISPLACED VIDEO RECORDING CHANNELS

[75] Inventor: Gerd Reime, Schömberg, Fed. Rep. of Germany

[73] Assignee: Nokia Unterhaltungselektronik GmbH, Fed. Rep. of Germany

[21] Appl. No.: 688,634

[22] Filed: Apr. 19, 1991

[30] Foreign Application Priority Data

May 14, 1990 [DE] Fed. Rep. of Germany ....... 4015391

[51] Int. Cl.[5] .............................................. G11B 5/02
[52] U.S. Cl. ....................................... 360/22; 360/30; 358/337
[58] Field of Search ................... 360/22, 33.1, 9.1, 29, 360/30; 358/327, 330, 335, 337

[56] References Cited

U.S. PATENT DOCUMENTS

| | | | |
|---|---|---|---|
| 4,388,656 | 6/1983 | Lemke | 360/22 X |
| 4,847,701 | 7/1989 | Suesada | 360/33.1 X |
| 4,941,055 | 7/1990 | Fujimoto | 360/33.1 X |
| 4,963,991 | 10/1990 | Honjo | 358/335 X |
| 5,038,219 | 8/1991 | Yamashita et al. | 360/9.1 X |

FOREIGN PATENT DOCUMENTS

| | | |
|---|---|---|
| 0149361 | 2/1990 | European Pat. Off. |
| 0382151 | 8/1990 | European Pat. Off. |
| 3109006 | 9/1982 | Fed. Rep. of Germany |
| 3919253 | 1/1990 | Fed. Rep. of Germany |

OTHER PUBLICATIONS

Patent Abstract of Japan vol. 9 No. 305 Dec. 1985 Recording and Reproducing Device of Video Signal, Matsuo.
Jamamitsu, C.; et al.: An Experimental Digital UTR Capable of 12-hour Recording. In: IEEE Transactions on Consumer Electronics, vol. CE-33, No. 3 Aug. 1987, S. 240-248.
Papoulis, Athanasios: Generalizes Sampling Expansion. In: IEEE Transactions on Circuits and Systems, vol. CAS-24 No. 11, Nov. 1977, S. 652-654.

*Primary Examiner*—Andrew L. Sniezek
*Attorney, Agent, or Firm*—Ware, Fressola, Van Der Sluys & Adolphson

[57] ABSTRACT

A video recorder for recording and reproducing video signals having a bandwidth with a limited upper transmission frequency, including HDTV signals. A recording signal processing circuit (14) with a first scanning circuit (10.1) for scanning the video signal to be recorded with first scanning recording pulses of a first scanning frequency that is at least equal to the limited upper transmission frequency, for providing the first recording signal (AS1), and a second scanning circuit (10.2) for scanning the video signal to be recorded with second scanning recording pulses that are displaced through half a cycle with respect to the first scanning pulses of the first scanning circuit (10.1), and having a second scanning frequency equal to the first scanning frequency, for providing the second recording signal (AS2). A recording/playback circuit (15, 16) includes recording-reproducing heads (11.1, 11.2) in close proximity to each other, for recording two recording signals (AS1, AS2) on two adjacent tracks of a magnetic tape (12), and for reading playback signals (LS1, LS2). The playback signal generating device (17) has a playback scanning switch (13) for alternately and successively scanning the playback signals (LS1, LS2) with playback scanning pulses, the switch (13) having a scanning frequency with pulses repeating at twice the first scanning frequency, for providing a composite playback video signal having the limited upper transmission frequency.

15 Claims, 3 Drawing Sheets

VIDEO RECORDER HAVING PHASE-DISPLACED VIDEO RECORDING CHANNELS

BACKGROUND OF THE INVENTION

1. Field of the Invention

The present invention concerns a video recorder with a doubled bandwidth of the recording track, especially for the recording and playback of HDTV signals, that is to say, for the recording and playback of signals having a frequency limit of 12 MHz with a recording-reproducing device having a limiting frequency of 6 MHz.

2. Description of the Prior Art

At the tape running speeds customary at the present time, the use of high-quality tapes and recording-reproducing heads with very fine head slits makes it possible to record video signals with a limiting frequency of 6 MHz even with video recorders of the home or semi-professional type. But if HDTV signals are to be recorded at the present state of technology and at the customary tape running speeds with such equipment of the home or semi-professional type, this will lead to obvious problems because the said HDTV signals have a limiting frequency of 12 MHz.

In the video recorder for the recording and reproduction of HDTV signals known from the German periodical "Funkschau Spezial" of 25 August 1989, pages 44 to 48, the input signal having a bandwidth of 12 MHz is scanned at a rhythm of 27 MHz and divided, line by line, into two parallel channels and fed into a digital store provided in each of the said channels. By means of these stores the signal packages are then expanded to roughly twice their original duration in time, which has the effect of halving the bandwidth of the packages. Following reconversion into analog signals and frequency modulation, the two recording signals each having a bandwidth of 6 MHz are recorded on a magnetic tape by means of a recording device with two recording-reproducing heads arranged in very close proximity to each other.

On the playback side of the known video recorder each set of recording signals recorded in two adjacent tracks is read with the help of the two closely adjacent recording-reproducing heads. Following frequency demodulation and analog/digital conversion, the reading signals obtained in this manner, each of which has a bandwidth of 6 MHz and a duration of 64 μs per signal package, are again stored in digital form and are then compressed in time in the stores of the two channels, after which the compressed signal packages are combined into a playback video signal having a bandwidth of 12 MHz. When carrying out this recombination process, care must be taken to obtain a smooth transition between the signal packages at the point of junction.

It is quite evident that the known method calls for a great deal of circuitry and that additional problems are caused by the requirement that the individual signal packages should be joined together in correct phase alignment.

Accordingly, there still remains the problem of defining a video recorder capable of recording and reproducing broadband video signals, especially HDTV signals, with a recording-reproducing device having a limiting frequency of 6 MHz or, more generally, a video recorder capable of recording and reproducing broadband video signals having a limiting frequency twice as great as the highest frequency of the bandwidth of the recording-reproducing device, where the said video recorder will work in a simple and reliable manner.

SUMMARY OF THE INVENTION

The video recorder according to the present invention with a doubled bandwidth of the recording track, especially for the recording and reproduction of HDTV signals, has the following characteristics:

a processing device for the recording signal with:
- a first scanning device for scanning the signal to be recorded with scanning pulses of a first scanning frequency that is at least equal to the said limiting frequency of the transmission and for providing an output consisting of the output signal produced by the scanning as the first recording signal, and
- a second scanning device for scanning the signal to be recorded with scanning pulses that are displaced through half a cycle with respect to those in the first scanning device and have a scanning frequency equal to the first scanning frequency, and for providing an output consisting of the output signal produced by the scanning as the second recording signal, a recording device for recording the two recording signals on two adjacent tracks of a magnetic tape by means of two recording heads arranged in close proximity to each other a playback device for reading the recording signals recorded in each set of adjacent tracks by means of reproducing heads arranged in close proximity to each other and for providing an output consisting of the read recording signals as playback signals, and and a playback signal production device with a playback scanning device for alternately and successively scanning the two read signals with scanning pulses, where the sequence of scanning pulses is such that the pulses follow each other at twice the first scanning frequency, and for providing an output consisting of the output signals produced by the scanning as playback signals.

As can be seen, this arrangement does not require any digital signal processing with intermediate storage of partial signal packages, all the signals to be recorded being processed and recorded directly just as the read recording signals are recombined directly into the playback signal.

The video recorder in accordance with the present invention is structured in a very simple manner, because instead of the extensive digital circuitry there are three scanning devices for converting the video signals of a given upper limiting frequency that are to be transmitted first into signals having a transmission bandwidth with half the said upper limiting frequency and then back into their original condition.

Advantageous embodiments and further developments of the invention are specified in the dependent claims.

It is advantageous if the scanning on both the recording and the playback side is performed in synchrony with the given contents of the video signal, an HDTV signal for example. To this end an advantageous further development of the invention is provided with a synchronization signal evaluation circuit on both the recording and the playback side. These circuits detect existing synchronization signals in the signal to be recorded and/or the recombined playback signal and in each case use these detected signals to synchronize an appropriate oscillator that supplies the scanning pulses. In the HDTV signals customary at the present time, for example, the signals suitable for this synchronization process are located in the data segment.

In an advantageous further development of the invention the scanning devices on both the recording and the playback side are each provided with a low-pass filter with a limiting frequency that does not substantially exceed half the scanning frequency of the associated scanning device. This arrangement ensures that the output signal corresponding to the scanning will be of high quality and free of disturbing ripple components (harmonics).

DETAILED DESCRIPTION OF THE PREFERRED EMBODIMENT

Figure 1:
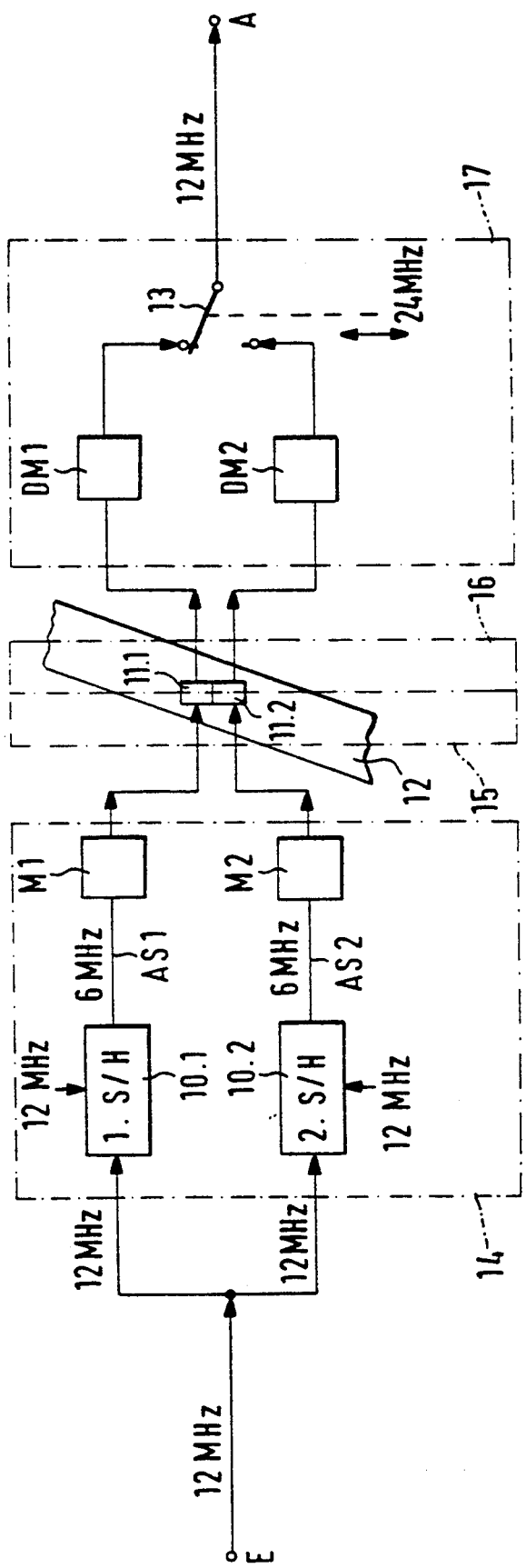
FIG. 1 shows a schematic block diagram of a videorecorder in which an HDTV signal to be recorded is scanned in such a manner as to make available two signals with half the limiting frequency of the incoming signal and with a displaced phase position, the said signals being subsequently read and recombined into an HDTV signal with the original limiting frequency.

In the block diagram of the essential functional components of a video recorder an incoming HDTV signal with a transmission band having a limiting frequency of 12 MHz passes from the input terminal E to a first scanning/holding circuit 10.1 and a second scanning/holding circuit 10.2. Each of these circuits scans the HDTV signal at 12 MHz, so that each of the two circuits will provide an output signal of a transmission band with a limiting frequency of 6 MHz, namely a first recording signal AS1 and a second recording signal AS2. These two recording signals, passing via the frequency modulators M1 or M2, reach one or the other of two closely adjacent recording-reproducing heads 11.1 and 11.2 that record the recording signals on two adjacent tracks of a magnetic tape 12. The recording is of the customary oblique type with a rotating head drum, and for the sake of readier visualization the tape 12 is therefore shown as running in a slightly skew direction. In the figure the recording-reproducing heads cover almost the entire width of the tape. It is well known that this does not correspond to actual reality, but again facilitates interpretation of the drawing.

On the playback side the recorded signals pass from the two closely adjacent recording-reproducing heads 11.1 and 11.2 through the frequency demodulators DM1 and DM2 as the first reading signal LS1 and the second reading signal LS2, eventually reaching a playback scanning device 13, which successively scans the two reading signals at a switching frequency of 24 MHz. As a result of this scanning at 24 MHz, the HDTV signal with a limiting frequency of 12 MHz is reobtained. It is made available for further processing at an output terminal A.

In the block diagram of FIG. 1, the two scanning circuits 10.1 and 10.2, together with their respective pulse-supply circuits, constitute a recording signal processing device 14. This device applies the recording signals AS1 and AS2 to a recording device 15 with the two recording/reproducing heads 11.1 and 11.2. Such further details of the recording device as the tape guide and the control circuits for the heads are not shown on the drawing. The same is true as regards the playback device 16 which utilizes the recording/reproducing heads 11.1 and 11.2 to reproduce the recorded signals. The reading signals LS1 and LS2 which represent the output of this playback device 16 are then processed by a playback signal generating device 17, which consists of the playback scanning circuit 13 and the associated scanning-pulse supply circuit.

The operation of a video recorder with the functional components shown in FIG. 1 will now be discussed with the help of FIG. 2.

The starting point for the illustrations of FIG. 1 is an HDTV signal, which for the sake of simplicity is assumed to have a sinusoidal pattern. Let the frequency of the sinusoidal signal be 12 MHz. If the maxima and minima of this signal are to be correctly captured during the scanning, a scanning frequency of 24 MHz will be needed. Scanning pulses with this high frequency are shown in FIG. 2 above the sinusoidal signal. Scanning at this high frequency would once again produce a signal with a limiting frequency of 12 MHz, and this frequency would be too great for recording by means of normal commercial video recorder equipment and at the customary tape speeds. At the customary tape speeds, even when high-quality tapes and recording-reproducing heads with very narrow slits are used, it is only possible to realize recording frequencies up to 6 MHz.

The video recorder according to FIG. 1 avails itself of the insight that the scanning of a signal with scanning pulses that repeat at a frequency of 12 MHz can yield an output signal with a limiting frequency of 6 MHz. When such a scanning is performed with two sequences of scanning pulses that each have a frequency of 12 MHz, but where the pulses of the first sequence are displaced through half a cycle with respect to the pulses of the second sequence, just as many points of an input signal will be scanned as in the case of a single scanning at 24 MHz. But the scanning results will now be contained in two output signals that will each have a limiting frequency of 6 MHz.

Figure 2:
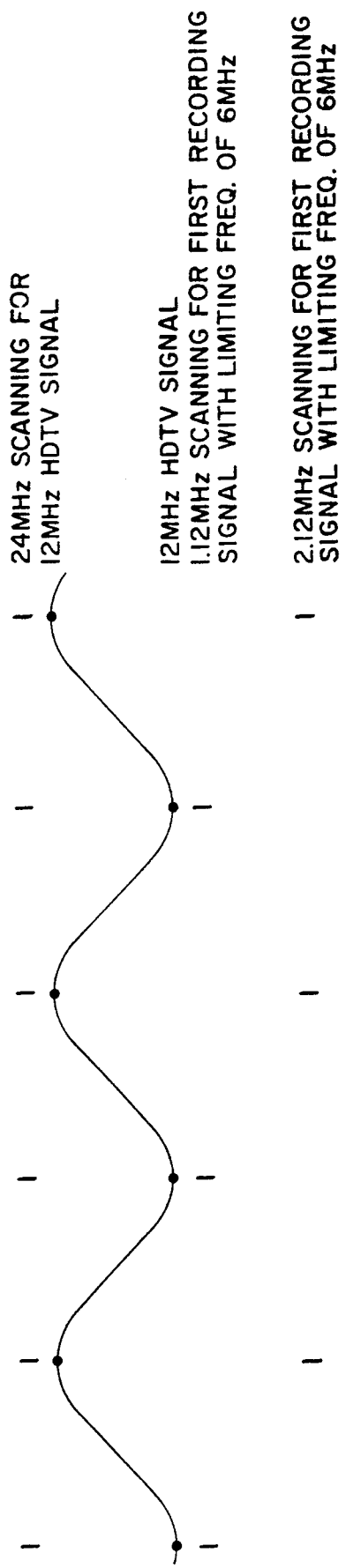
FIG. 2 shows a sinusoidal HDTV signal, complete with an indication of the various scanning points, thus illustrating the function of the circuit shown in FIG. 1.

FIG. 2 shows a first sequence of scanning pulses below the presumed sinusoidal HDTV input signal. In the illustrated embodiment these pulses scan the various minima of the HDTV signal, i.e. at a repetition frequency of 12 MHz. This produces a first recording signal AS1 with a limiting frequency of 6 MHz. Below this first sequence of scanning pulses there is shown a second sequence, the pulses of this second sequence being displaced through half a cycle with respect to those of the first, so that these pulses will scan the various maxima of the HDTV signal. This produces the second recording signal AS2, which will once again have a limiting frequency of 6 MHz.

Once the two recording signals just described have been recorded on the tape, they can be reobtained as the reading signals LS1 and LS2 by the reading process of a subsequent reproduction device. In view of the fact that the playback scanning circuit 13 is designed as a reversing switch that switches between these two reading signals at a frequency of 12 MHz, this reversing switch will scan all the points corresponding to the originally scanned points of the HDTV input signal, i.e. it will scan successively a point corresponding to a minimum and then a point corresponding to a maximum. One thus reobtains the original HDTV signal with a transmission bandwidth of 12 MHz.

Figure 3:
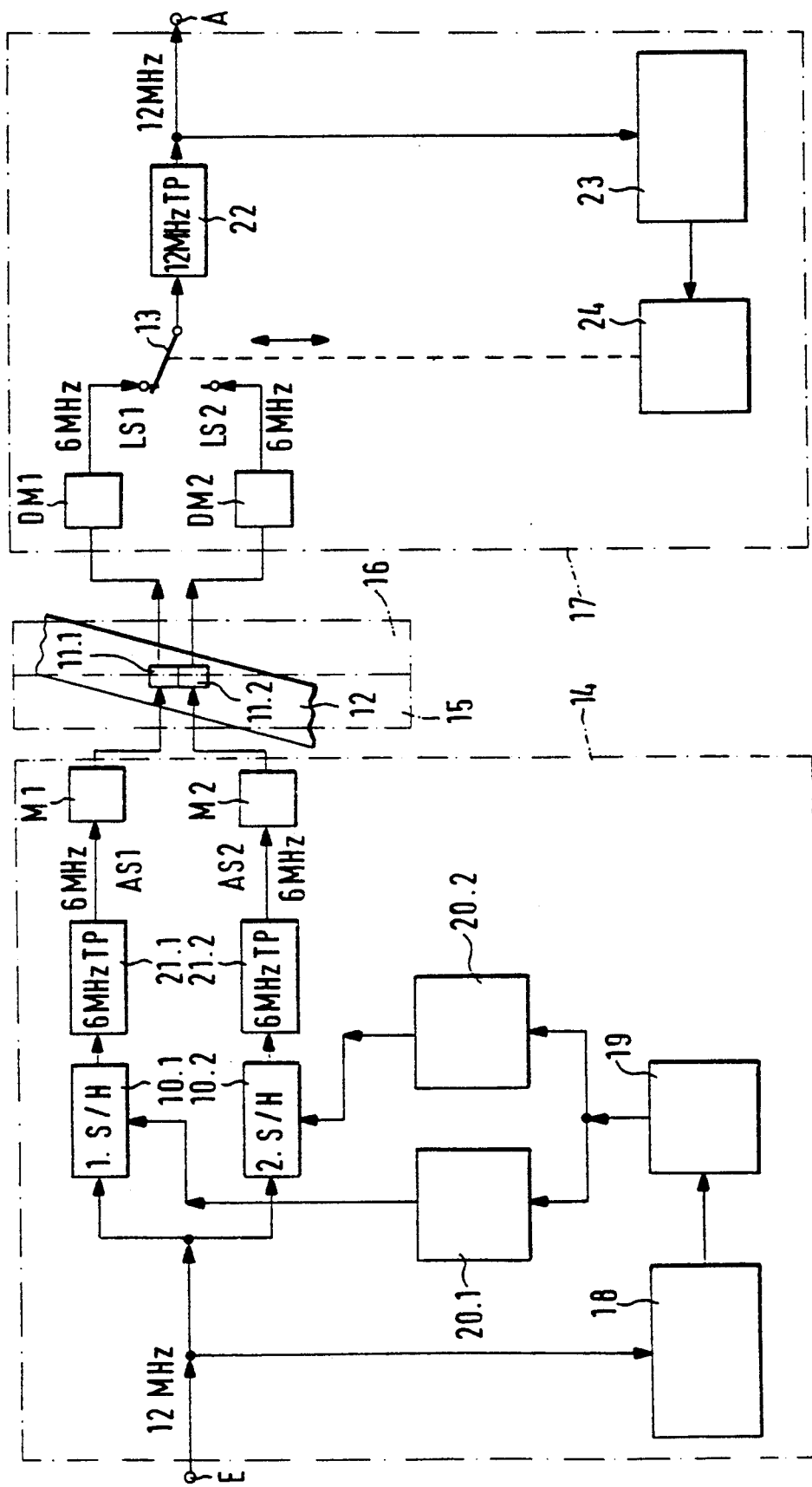
FIG. 3 shows a more detailed block diagram of the video recorder according to FIG. 1.

It can be seen from FIG. 2 that the greatest difference between the signals read during scanning will be obtained when the scanning is performed at the exact maximum and minimum points. The scanning frequency necessary to ensure this can be obtained from the HDTV signal. This signal is already synchronized, so that the corresponding scanning rate can also be used for the recording. The phase can likewise be obtained in a customary manner from the HDTV signal itself. How this can be done will now be illustrated with the help of FIG. 3. FIG. 3 also shows a number of further details that serve to ensure greater functional reliability when a circuit incorporating the principle of the circuit shown in FIG. 1 is put to practical use, and also some other advantageous embodiments and further developments of the said circuit shown in FIG. 1. In the circuit according to FIG. 3, in fact, the recording signal processing device 14 comprises not only the two scanning circuits 10.1 and 10.2 and the frequency modulators M1 and M2, but also an input synchronization signal evaluation circuit 18, an input oscillator arrangement 19, and two pulse generators 20.1 and 20.2. The said input synchronization signal evaluation circuit 18 will analyze the HDTV signal applied to the input terminal E for signal components with which the scanning process is to be synchronized in the given manner. The signals in question could be signals from the data segment of the HDTV signal. The synchronization signal obtained by the input synchronization signal evaluation circuit 18 is then used to synchronize the input oscillator arrangement 19, which in the embodiment here considered produces a sinusoidal signal at 12 MHz. The first pulse generator 20.1 provides a pulse at every rise of the sinusoidal signal in the positive direction, while the pulse generator 20.2 provides a pulse at every transition into the negative direction. The two pulse trains are thus displaced through half a cycle with respect to each other. The first pulse generator applies its output signal to the first scanning/holding circuit 10.1, while the second applies its signal to the second scanning/holding circuit 10.2. The HDTV signal on the input side is scanned at every pulse. The scanning could be very brief, but could also extend over a small interval of time that could correspond at the most to a half cycle of the scanning signal. When the scanning extends over such an interval of time, an integrated signal is provided as the output signal.

Since ripple components come into being during the scanning of the HDTV signal, the output signals provided by the sample/hold circuits 10.1 and 10.2 are not applied directly to the modulator unit and then to the recording-reproducing heads 11.1 and 11.2, but appropriate 6 MHz low-pass filters 21.1 and 21.2 are included in the respective signal paths. These low-pass filters eliminate the ripple components, so that the recording signals AS1 and AS2 provided by them are made suitable for disturbance-free recording by virtue of the fact that the said filters limit the frequency range of these recording signals to a limiting frequency of 6 MHz.

Since ripple components are also produced in the playback signal generating device 17 by scannning with the aid of the reversing switch 13, the output signal produced by the scanning is passed through a 12 MHz low-pass filter 22 before it is made available at the output terminal A. The HDTV signal with a frequency limit of 12 MHz recomposed in this manner is also applied to an output synchronization signal evaluation circuit 23.

The synchronization signal provided as the output of the output synchronization signal evaluation circuit 23 is applied to a playback-side oscillator arrangement 24 that synchronously controls the playback scanning device 13. The playback scanning device is shown in FIG. 3 as a mechanical reversing switch, but in actual practice an electronic reversing switch is used for this purpose.

Moreover, the synchronization signal evaluation circuits on both the input and the output side can also be provided with a start-up circuit. The start-up circuit has the normal purpose of such circuits, namely to accelerate the synchronization process when the equipment is first switched on.

The embodiments refer to the recording and the reproduction of an HDTV signal with a limiting frequency of 12 MHz by means of a recording-reproducing device 15, 16 having a limiting frequency of 6 MHz. Quite generally, however, it can be said that the video recorder structure here described makes it possible to record and reproduce signals having a limiting frequency twice as great as that of the device used to record and reproduce them.

What is claimed is:

1. A video recorder for recording and reproducing video signals, including HDTV signals, comprising recording signal processing means (14) for dividing video signals having a bandwidth with a limited upper transmission frequency, for providing recording signals, including first and second recording signals (AS1, AS2), each recording signal having a recording/reproducing bandwidth with at least half the limited upper transmission frequency;

recording means (15) having recording-reproducing heads (11.1, 11.2) in close proximity to each other, for recording the two recording signals on two adjacent tracks of a magnetic tape (12);

playback means (16) for reading the two recording signals (AS1, AS2) recorded on the two adjacent tracks by means of the recording-reproducing heads (11.1, 11.2), and for providing playback signals (LS1, LS2); and a playback signal generating means device (17) for providing the playback signals (LS1, LS2) at the limited upper transmission frequency generated from the playback signal (LS1, LS2);

wherein the recording signal processing device (14) further comprises:

a first scanning means (10.1) for scanning the video signal to be recorded with first scanning recording pulses of a first scanning frequency that is at least equal to the limited upper transmission frequency, for providing the first recording signal (AS1), and a second scanning means (10.2) for scanning the video signal to be recorded with second scanning recording pulses that are displaced through half a cycle with respect to the first scanning pulses of the first scanning device (10.1), and having a second scanning frequency equal to the first scanning frequency, for providing the second recording signal (AS2); and wherein the playback signal generating device (17) further comprises a playback scanning device (13) for alternately and successively scanning the playback signals (LS1, LS2) with playback scanning pulses, having a scanning frequency with pulses repeating at twice the first scanning frequency, for providing a composite playback video signal having the limited upper transmission frequency.

2. A video recorder in accordance with claim 1, characterized by an input synchronization signal evaluation circuit (18) for evaluating a recording synchronization signal in the video signals to be recorded and for synchronizing the first and second scanning recording pulses with the synchronization signal, and an output synchronization signal evaluation circuit (23) for evaluating a playback synchronization signal in the playback signals and for synchronizing the playback scanning pulses with the playback synchronization signal.

3. A video recorder in accordance with claim 2, characterized in that the playback scanning device (13) is an electronic reversing switch controlled by the scanning playback pulses.

4. A video recorder in accordance with claim 3, characterized in that the first and second scanning means (10.1, 10.2) comprise a low-pass filter on their output side having a limiting frequency that is equal to substantially half the scanning frequency of the playback scanning device (13).

5. A video recorder in accordance with claim 2, characterized in that the first and second scanning means (10.1, 10.2) comprise a low-pass filter on their output having a limiting frequency that is equal to substantially half the scanning frequency of the playback scanning device (13).

6. A video recorder in accordance with claim 1, characterized in that the playback scanning device (13) is an electronic reversing switch controlled by the scanning playback pulses.

7. A video recorder in accordance with claim 1, characterized in that the first and second scanning means (10.1, 10.2) each comprise a low-pass filter on their output side having a limiting frequency that is equal to substantially half the scanning frequency of the playback scanning device (13).

8. A video recorder in accordance with claim 7, characterized in that the playback scanning device (13) comprises a low-pass filter (22) on its output side having a frequency substantially equalling the limited upper transmission frequency.

9. A video recorder for recording and reproducing video signals, including HDTV signals, on adjacent tracks of a magnetic tape, comprising recording signal processing means (14) having scanning means (10.1, 10.2), responsive to video signals having a bandwidth with an limited upper transmission frequency, for providing recording signals (AS1, AS2) each having a recording/reproducing bandwidth with at least half the limited upper transmission frequency, and recording signal (AS1, AS2), each having a respective different phase;

recording means (15) having recording-reproducing heads (11.1, 11.2) in close proximity to each other, each responsive to an associated recording signal, each for providing a separate recorded video signal to a respective one of the adjacent tracks of the magnetic tape (12);

playback means (16) including the recording-reproducing heads (11.1, 11.2), each responsive to one of the separate recorded video signals, each for providing a separate play back video signals (LS1, LS2) from the respective one of the adjacent tracks; and a playback signal generating device (17) having a playback switching means (13), alternately and successively responsive to the separate playback video signals (LS1, LS2), for providing a composite playback video signal (LS1, LS2) having the limited upper transmission frequency.

10. A video recorder according to claim 9, wherein the playback signal generating device (17) alternately and successively scans the two playback signals (LS1, LS2) with scanning pulses having a scanning frequency with pulses repeating at twice the first scanning frequency.

11. A video recorder according to claim 10, wherein first scanning pulses of the first scanning frequency are substantially equal to half the limited upper transmission frequency.

12. A video recorder according to claim 11, wherein second scanning pulses having a second scanning frequency equal to the first scanning frequency and are displaced through half a cycle with respect to the first scanning pulses of the first scanning device (10.1).

13. A video recorder according to claim 12, wherein the scanning means includes first and second scanning circuits (10.1, 10.2); and the recording signal processing device (14) includes a first pulse generator (20.1) for providing first scanning pulses to the first scanning circuit (10.1) and a second pulse generator (20.2) for providing second scanning pulses to the second scanning circuit (10.2).

14. A video recorder according to claim 9, wherein the recording signal processing device (14) includes an input synchronization signal evaluation circuit (18) and an input oscillator (19).

15. A video recorder according to claim 9, wherein the playback signal generating device (17) includes a playback side oscillator circuit (24) and an output synchronization signal evaluation circuit (23).

* * * * *